United States Patent [19]
Laflin et al.

[11] Patent Number: 4,898,769
[45] Date of Patent: Feb. 6, 1990

[54] FIBRE REINFORCED COMPOSITE MATERIAL

[75] Inventors: Philip Laflin, Manchester; Ian Molyneux, Warrington, both of United Kingdom

[73] Assignee: Tenmat Ltd., Manchester, England

[21] Appl. No.: 350,797

[22] Filed: May 12, 1989

[30] Foreign Application Priority Data

Jun. 1, 1988 [GB] United Kingdom ................ 8812923

[51] Int. Cl.$^4$ .............................................. B32B 5/16
[52] U.S. Cl. .................... 428/283; 428/280; 428/281; 428/284; 428/285; 428/300; 428/328; 428/703
[58] Field of Search ............... 428/284, 285, 282, 281, 428/280, 283, 328, 703, 300

[56] References Cited

U.S. PATENT DOCUMENTS 4,572,862  2/1986  Ellis ..................................... 428/703
4,572,864  2/1986  Benson et al. ...................... 428/703

Primary Examiner—James J. Bell
Attorney, Agent, or Firm—Nixon & Vanderhye

[57] ABSTRACT

In composite material comprising a water-insoluble aluminous cement matrix to which are bonded superimposed layers of glass fibre fabric enclosed within it as reinforcement, said fabric is a mechanically bonded chopped strand glass mat of mass/unit area not greater than 850 g/m$^2$.

The composite material is useful as an electrical insulant, particularly at high temperatures eg 850° C.

8 Claims, No Drawings

FIBRE REINFORCED COMPOSITE MATERIAL

This invention relates to fibre-reinforced composite material and more particularly to composite material comprising a water-insoluble aluminous cement matrix to which are bonded superimposed layers of glass fibre fabric which are enclosed within it as reinforcement.

An example of such material is a sheet which comprises high alumina cement and enclosed layers of glass fibre fabric and is sold as an electrical insulant for use at elevated temperatures (eg at 850° C.), for example for lining power transmission assemblies to prevent arcing between live terminals and earth. This non-asbestos material (described in FR-8106250 and EPA-A-63505) has many of the useful properties possessed by asbestos-reinforced high-density Portland cement board, which is it has now largely replaced, but it is expensive; and the expense arises primarily from the cost of the glass fibre fabric employed, which is a fabric woven form glass thread of 68 tex.

We have now found that an acceptable and cheaper alternative to the fabric just described is provided by a mechanically bonded chopped strand glass mat of mass-/unit area not greater than 850 g/m$^2$, such as is sold as reinforcement for the manufacture of glass fibre reinforced plastics from polyester resins.

According to the invention, there is provided composite material comprising a water-insoluble aluminous cement matrix to which are bonded superimposed layers of glass fibre fabric enclosed within it as reinforcement, in which material said fabric is a mechanically bonded chopped strand glass mat of mass/unit area not greater than 850 g/m$^2$.

The water-insoluble aluminous cement matrix is preferably high alumina cement (sometimes called 'calcium-aluminate cement'), as in the product earlier referred to. However, good performance at elevated temperature can also be obtained using aluminium phosphate (ALPO$_4$) as matrix. The aluminous cement matrix may be diluted with particles of alumina or other cheap refractory metallic oxide. Products with very good resistance to thermal shock can be obtained by using boehmite (ALO.OH) as a component of the aluminous cement from which the composite material is made.

Because bonding of the chopped strand in the mat arises purely from interlocking of the glass fibres with one another rather than from the use of chemical binding agents, wetting out of the mat with relatively high viscosity aluminous cement slurry during preparation is fast. The weight proportion of mat in the composite material is preferably in the range 5-25%, particularly 5-15%; and the density of the product is preferably in the range 1.8–2,3 g/cm$^3$. The invention is further illustrated by the following Examples, which describe the preparation of composite material in the form of sheet useful as an arc chute.

EXAMPLE 1

Mechanically bonded chopped strand glass mat (mass/unit area =450 g/m$^2$) sold under the trade mark NEOMAT was impregnated with an aqueous slurry (65% byweight solids) of the high alumina cement sold under the trade mark SECAR (AL$_2$O$_3$ content, 71%; CaO content, 27% by weight). uptake of slurry was about 14 times the weight of the mat.

Six impregnated mats were placed one on top of the other, and the assembly was pressed until its thickness was reduced to about 1.3cm. The sheet thus formed as immersed for 24 hours in water at ambient temperature to allow the high alumina cement to cure. The product had the following properties:

| | |
|---|---|
| Density | 2 g/cm$^3$ |
| Shear strength | 23 MPa |
| Flexural strength | 25 MPa |
| Impact strength (notched Izod) | 4.2 kJ/m$^2$ |
| Compressive strength | 98 MPa |
| Electrical | |
| surface breakdown in air at 90° C. | 17 kV |
| strength in air at 90° C. | 1.1 MV/m |

EXAMPLE 2

The glass mat employed in Example 1 was impregnated with an aqueous slurry (72% by weight solids) of a mixture of calcined alumina (specific surface area 1m$^2$/g; particle median diameter 5 μm) and boehmite (γ-ALO.OH, available as BACOSOL 2C (trade mark); particle size 0.1 –0.2 μm), the weight proportion Al$_2$O$_3$:ALO.OH being 3:2. Uptake of slurry was about 11 times the weight of the mat. A pressed sheet about 1.3cm thick was formed as in Example 1, and was dried at 150° C. It was then immersed for 3 hours in aqueous H$_3$PO$_4$ (20%) and then heated in an over at 300° C. for 24 hours to complete the conversion of ALO.OH to ALPO$_4$.

The product had properties similar to those of the product of Example 1, but it was more resistant to heat and could additionally be used as a furnace lining. In a standard carbon arc test, it showed a resistance to thermal shock much better than that of the material of FR8106250.

EXAMPLE 3

The glass mat employed in Example 1 was impregnated with an aqueous slurry (60% by weight solids) of a mixture of high alumina cement, calcined alumina and boehmite, in the weight proportions 16: 7:1.32. Uptake of the slurry was about 12 times the weight of the mat. A pressed sheet about 1.3cm thick was formed as in Example 1. The pressed sheet was immersed for 24 hours in water at ambient temperature to allow the cement to cure. Compared with the product of Example 1, the product (density 2.1 g/cm$^3$ had improved flexural strength (37 MPa) and compressive strength (120 MPa) and, like the product of Example 2, it has very good resistance to thermal shock.

We claim:

1. Composite material comprising a water-soluble aluminous cement matrix to which are bonded superimposed layers of glass fibre fabric enclosed within it as reinforcement, wherein said fabric is a mechanically bonded chopped strand glass mat of mass/unit area not greater than 850 g/m$^2$.

2. Composite material according to claim 1, in which the matrix is high alumina cement.

3. Composite material according to claim 1, in which the matrix is aluminium phosphate.

4. Composite material according claim 1, in which the matrix includes particles of alumina.

5. Composite material according to claim 1, obtained by including boehmite in the aluminous cement from which the composite is made.

6. Composite material according to claim 1, in which the mechanically bonded chopped strand mat forms from 5 to 25% by weight of the material.

7. Composite material according to claim 1, having a density in the range 1.8 –2.3 g/cm$^3$.

8. Composite material according to claim 1, in the form of sheet.

* * * * *